US012794398B2

(12) United States Patent
Park

(10) Patent No.: US 12,794,398 B2
(45) Date of Patent: Nov. 10, 2026

(54) INVERTER CONTROL DEVICE AND METHOD

(71) Applicant: LG ELECTRONICS INC., Seoul (KR)

(72) Inventor: Moonho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 18/726,530

(22) PCT Filed: Nov. 7, 2022

(86) PCT No.: PCT/KR2022/017368
§ 371 (c)(1),
(2) Date: Jul. 3, 2024

(87) PCT Pub. No.: WO2024/053779
PCT Pub. Date: Mar. 14, 2024

(65) Prior Publication Data

US 2025/0183837 A1 Jun. 5, 2025

(30) Foreign Application Priority Data

Sep. 5, 2022 (KR) ........................ 10-2022-0111925

(51) Int. Cl.
*H02P 7/29* (2016.01)
*H02P 23/14* (2006.01)
*H02P 29/68* (2016.01)

(52) U.S. Cl.
CPC .............. *H02P 29/68* (2016.02); *H02P 23/14* (2013.01)

(58) Field of Classification Search
CPC ........ H02P 29/68; H02P 23/14; H02P 27/085; H02P 27/08; H01C 7/04; H02M 1/32; H02M 1/327
See application file for complete search history.

(56) References Cited

U.S. PATENT DOCUMENTS 7,149,098 B1 12/2006 Chen
2002/0196004 A1 12/2002 Berson et al.

FOREIGN PATENT DOCUMENTS

JP 2005-143232 6/2005
JP 2010-172124 8/2010
(Continued)

OTHER PUBLICATIONS

J. Lemmens, P. Vanassche and J. Driesen, "Optimal Control of Traction Motor Drives Under Electrothermal Constraints," in IEEE Journal of Emerging and Selected Topics in Power Electronics, vol. 2, No. 2, pp. 249-263, Jun. 2014, doi: 10.1109/JESTPE.2014.2299765.*
(Continued)

*Primary Examiner* — Muhammad S Islam
(74) *Attorney, Agent, or Firm* — KED & ASSOCIATES, LLP

(57) ABSTRACT

The present specification relates to an inverter control device and method. The inverter control device according to one embodiment of the present specification comprises: an inverter control unit, which generates, on the basis of a signal detected from the motor or an inverter, a pulse width modulation (PWM) signal for controlling the rotation speed or torque of a motor, in order to supply same to the inverter; and a current limitation unit, which applies a detected temperature to an equation based on a first temperature and a second temperature, that is higher than the first temperature, so as to calculate a current limitation rate for limiting a current to be supplied to the motor through the inverter, in order to provide same to the inverter control unit, wherein the inverter control unit can change the PWM signal on the basis of the current limitation rate. The current limitation unit can generate the current limitation rate as 1 if the detected temperature is lower than the first temperature, generate the current limitation rate as 0 if the detected
(Continued)

temperature is higher than the second temperature, and generate the current limitation rate such that same gradually decreases to be between 0 and 1 as the detected temperature increases if the detected temperature is between the first temperature and the second temperature.

15 Claims, 10 Drawing Sheets

(56) References Cited

FOREIGN PATENT DOCUMENTS

| | | |
|---|---|---|
| JP | 2016-019356 | 2/2016 |
| JP | 2021-114826 | 8/2021 |
| KR | 10-2016-0085574 | 7/2016 |
| KR | 10-2018-0060012 | 6/2018 |

OTHER PUBLICATIONS

International Search Report (with English Translation) and Written Opinion dated Jun. 2, 2023 issued in Application No. PCT/KR2022/017368.

Korean Office Action dated Aug. 17, 2024 issued in Application No. 10-2022-0111925.

* cited by examiner

【FIG. 1】
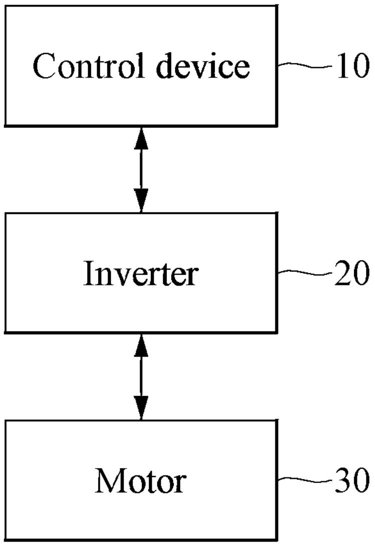
【FIG. 2】
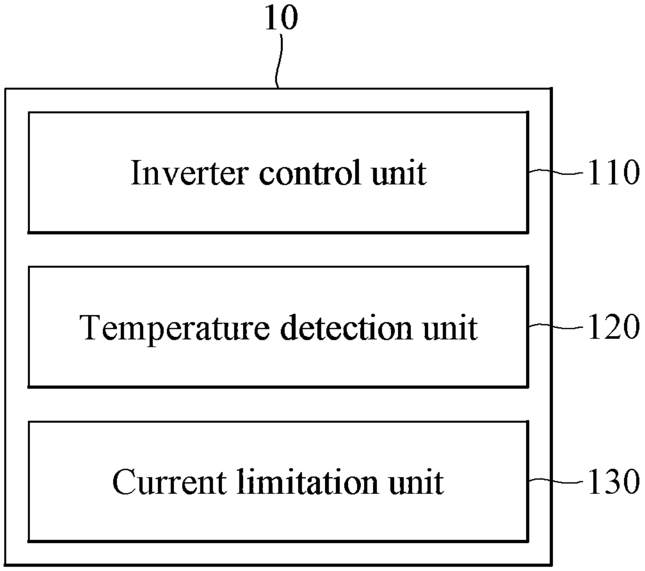

【FIG. 3】
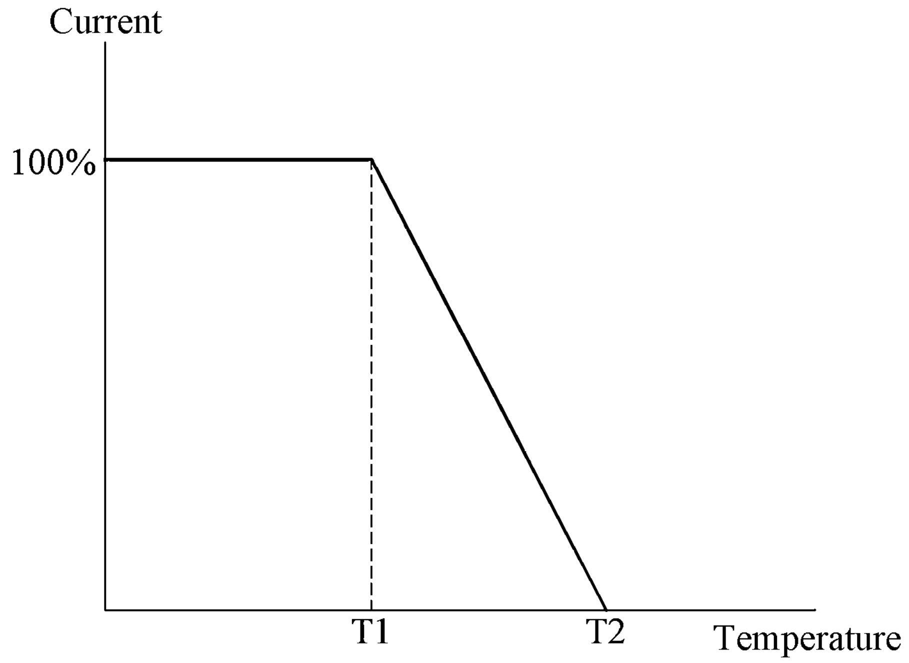

【FIG. 4】

| Actual temperature(°C) | Temperature AD value | Limitation rate (based on 80-degree current) | Expected power (based on 300 W) |
|---|---|---|---|
| 80 | 1672 | 1 | 330 |
| 80.04934 | 1673 | 0.996711 | 328.9145 |
| 80.09868 | 1674 | 0.993421 | 327.8289 |
| 80.14803 | 1675 | 0.990132 | 326.7434 |
| 80.19737 | 1676 | 0.986842 | 325.6579 |
| 80.24671 | 1677 | 0.983553 | 324.5724 |
| … | … | … | … |
| 94.75329 | 1971 | 0.016447 | 5.427632 |
| 94.80263 | 1972 | 0.013158 | 4.342105 |
| 94.85197 | 1973 | 0.009868 | 3.256579 |
| 94.90132 | 1974 | 0.006579 | 2.171053 |
| 94.95066 | 1975 | 0.003289 | 1.085526 |
| 95 | 1976 | 0 | 0 |

【FIG. 5】
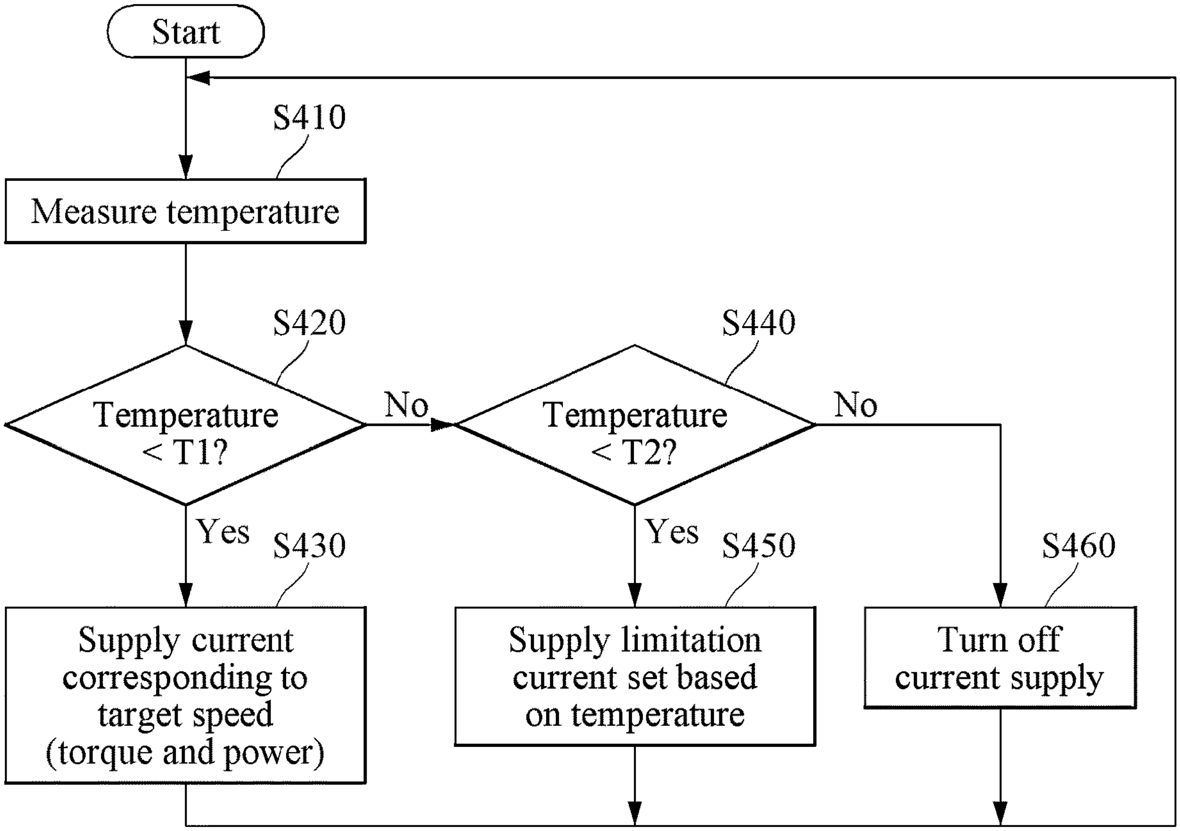

【FIG. 6】
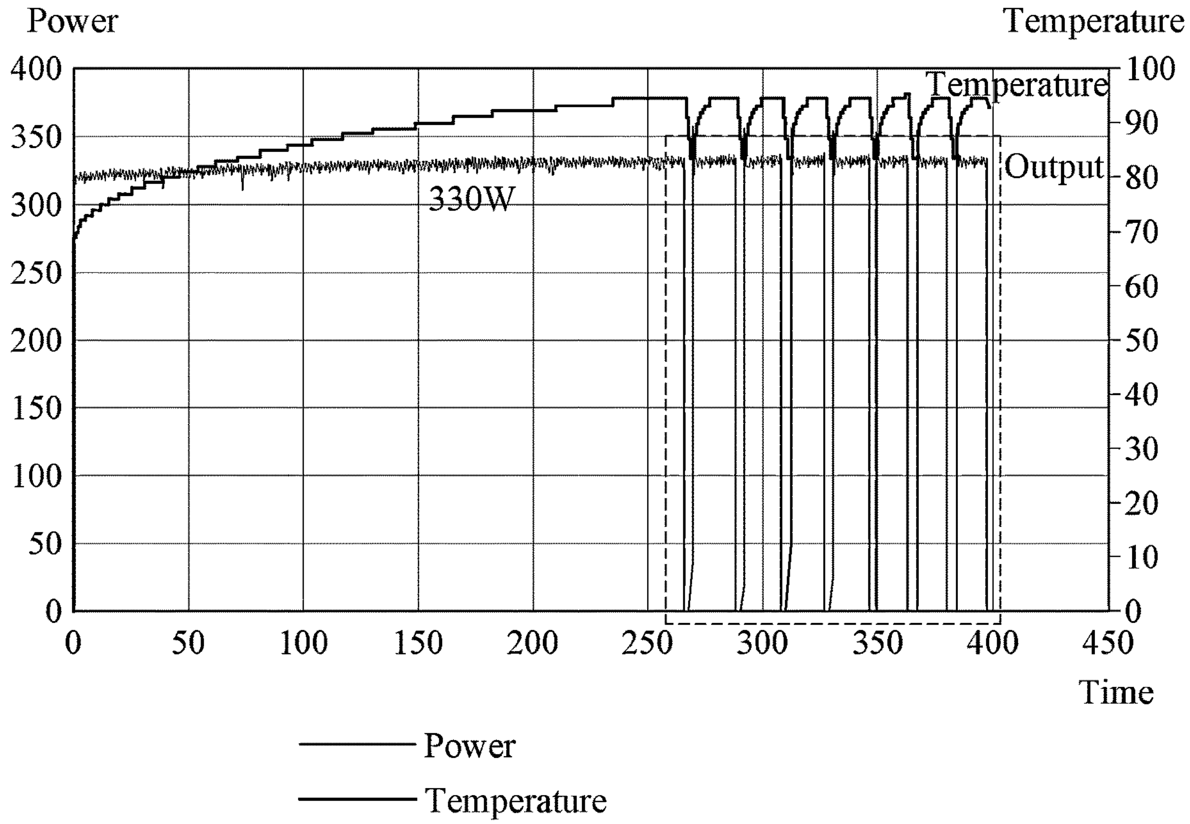

【FIG. 7】
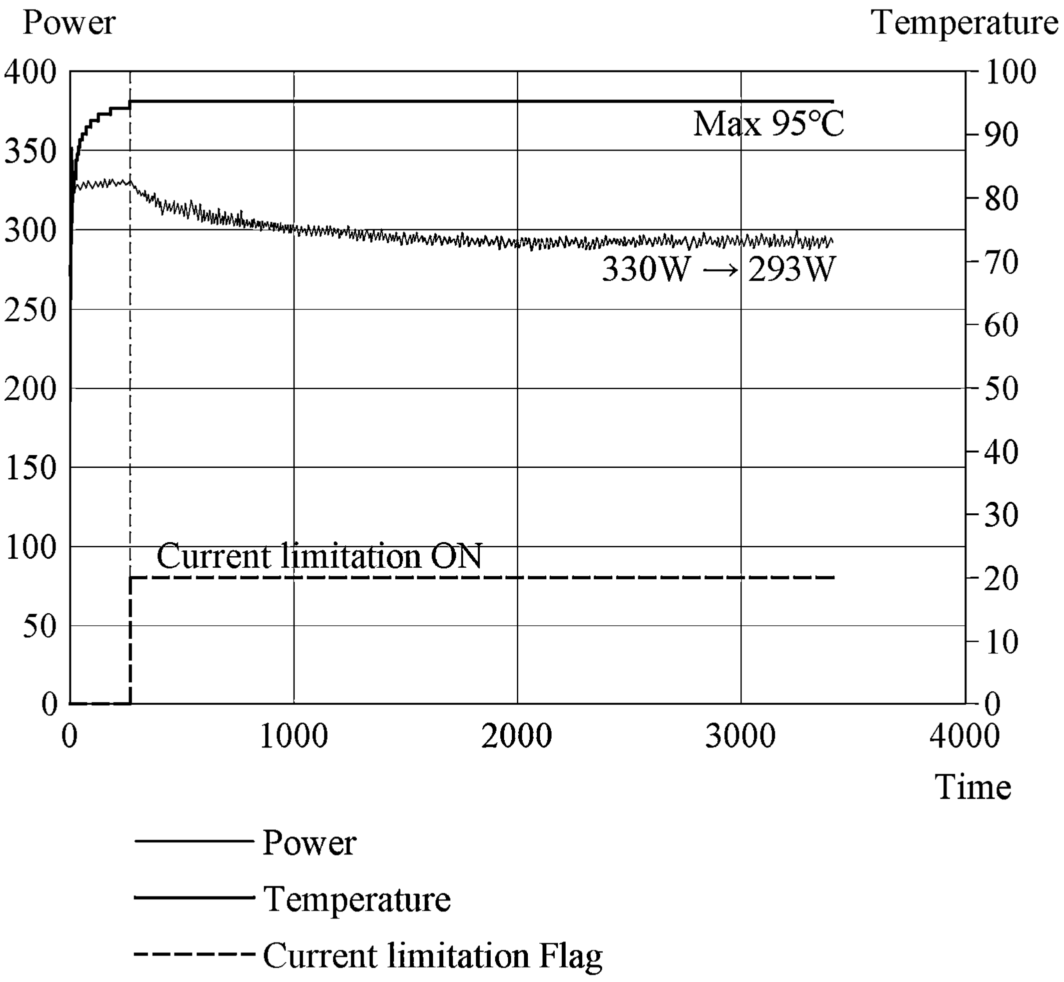

【FIG. 8】
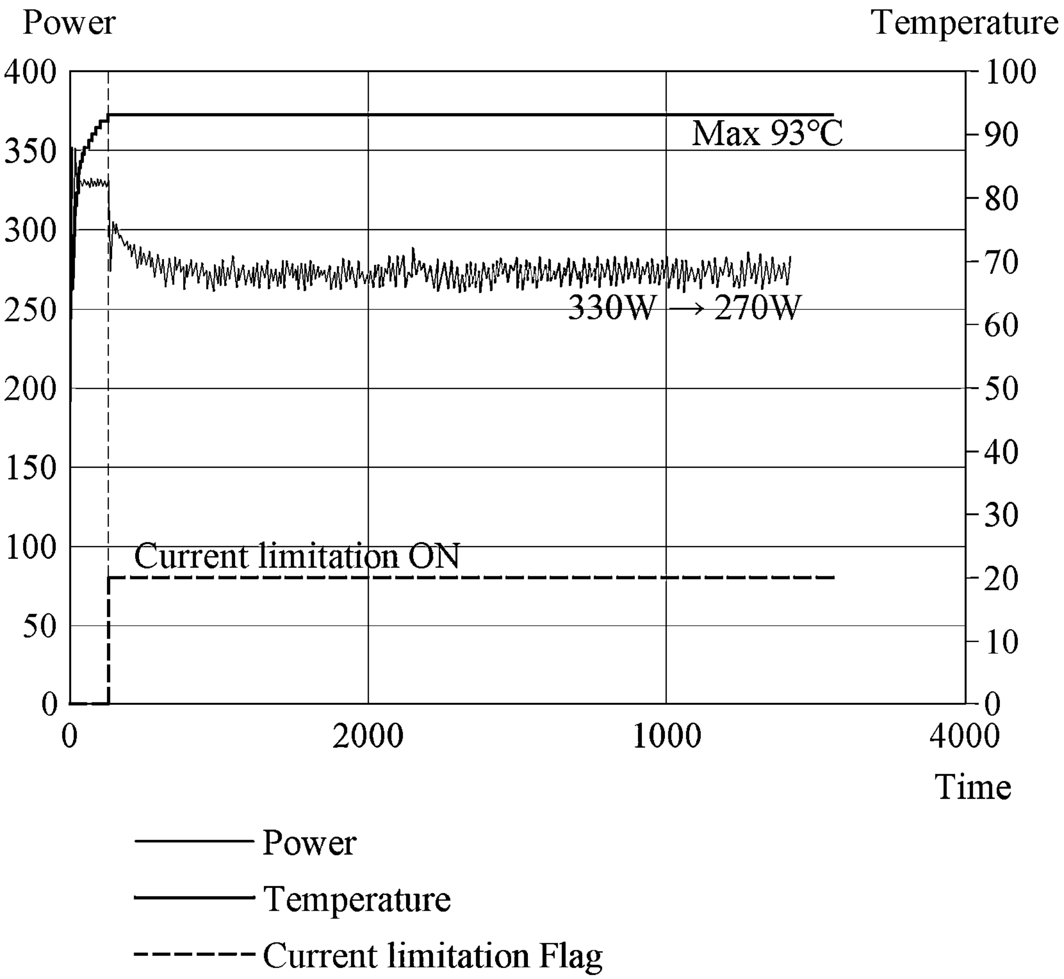

【FIG. 9】
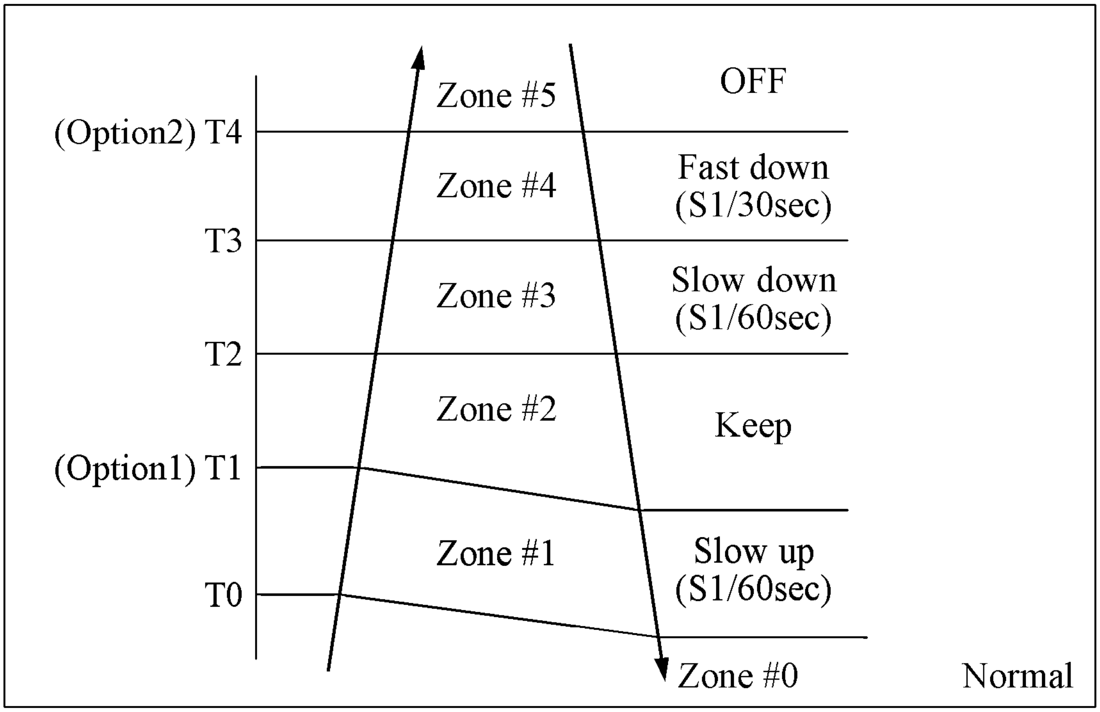
【FIG. 10】
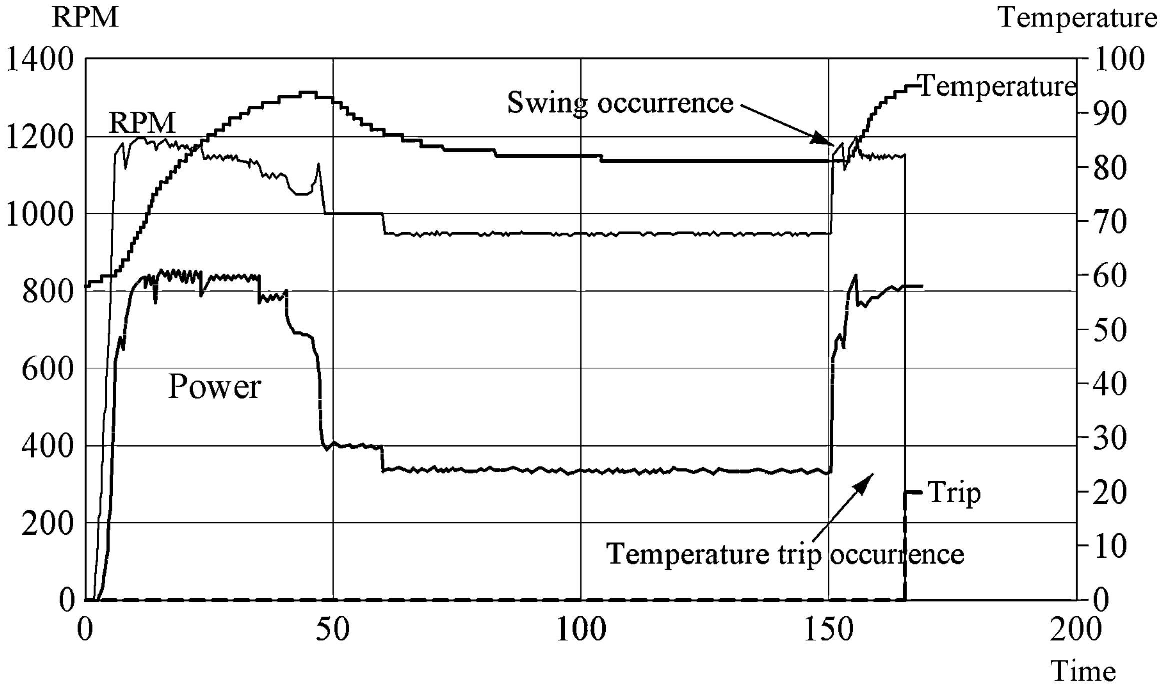

【FIG. 11A】
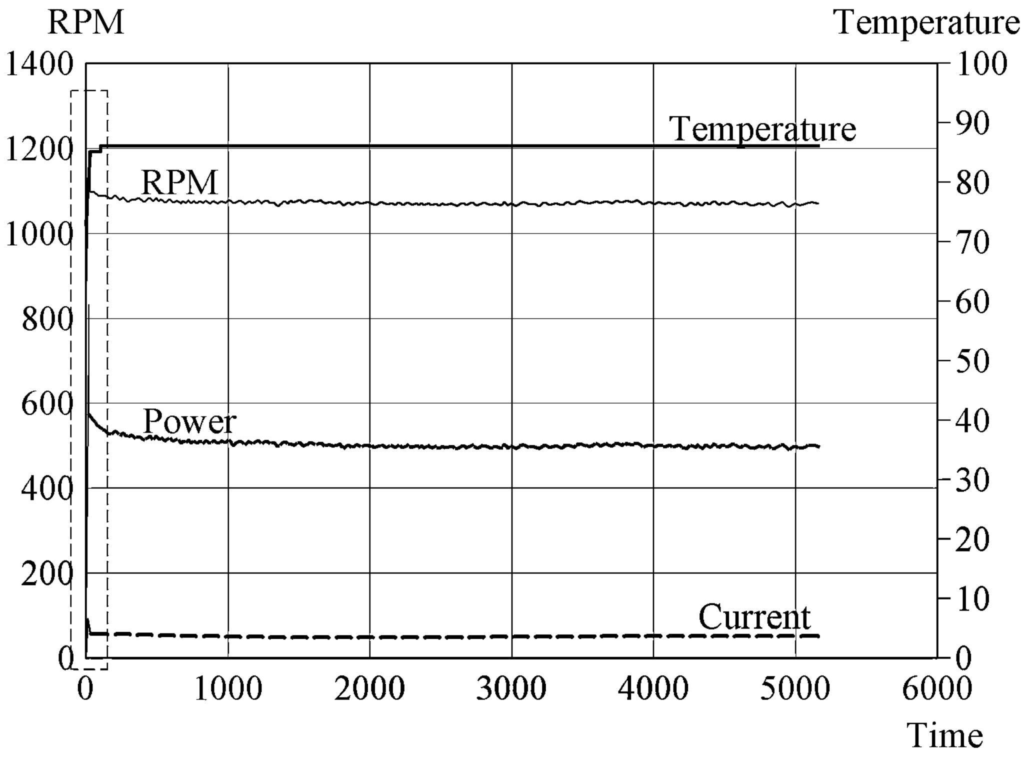

【FIG. 11B】
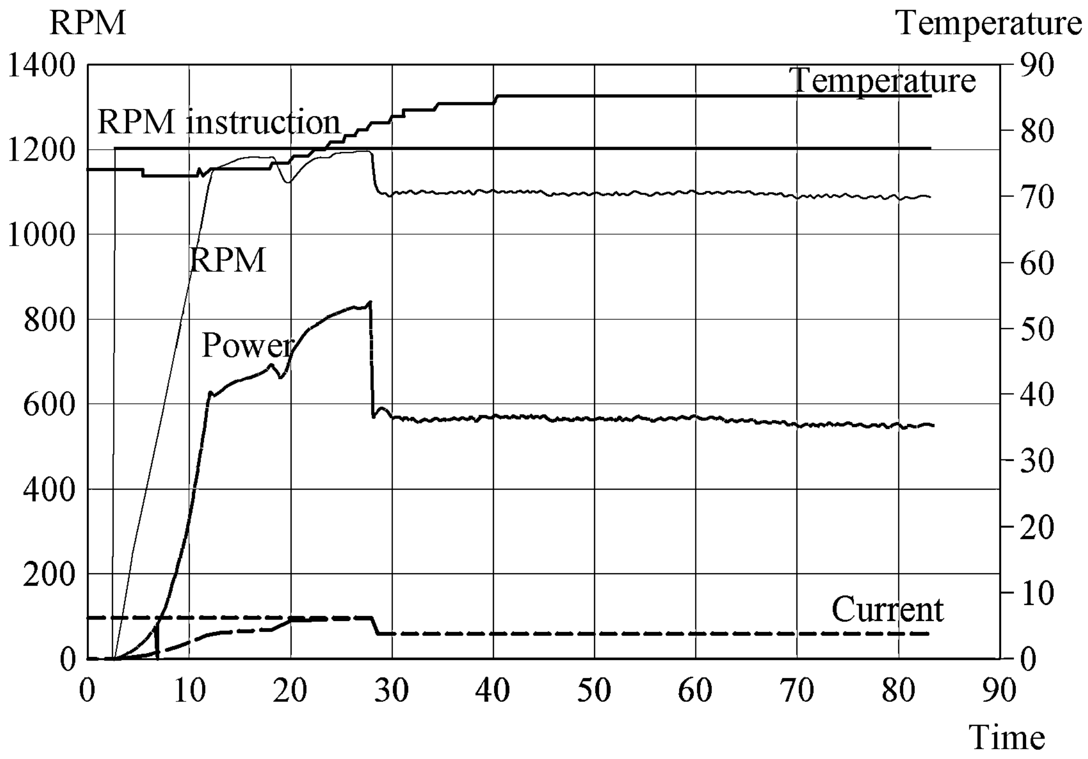

INVERTER CONTROL DEVICE AND METHOD

CROSS-REFERENCE TO RELATED PATENT APPLICATIONS

This application is a U.S. National Stage Application under 35 U.S.C. § 371 of PCT Application No. PCT/KR2022/017368, filed Nov. 7, 2022, which claims priority to Korean Patent Application No. 10-2022-0111925, filed Sep. 5, 2022, whose entire disclosures are hereby incorporated by reference.

TECHNICAL FIELD

The present disclosure relates to an inverter control device and method, and more particularly, to an inverter control device and method which limits an output current of an inverter based on a temperature.

BACKGROUND ART

In recent years, most Heating, Ventilating and Air Conditioning (HAVC) variably controls the rotation of a motor of a compressor by using an inverter in order to increase efficiency, that is, to reduce power consumption and reduce noise.

In addition, in recent years, the Heating, Ventilating and Air Conditioning (HAVC) has shown a trend of being complicated as multiple devices are connected, for example, a trend in which multiple indoor units are connected to one indoor unit, and used. Each indoor unit may have a different capacity or temperature required, and it is necessary to precisely control the motor of the outdoor unit to satisfy both the capacity and temperature conditions of various indoor units at the same time. In addition, there is room for overloading in the inverter that drives the motor at the same time in the hot summer.

Since the inverter generates a driving current based on a pulse width modulation signal and supplies the generated driving current to the motor, the inverter includes a plurality of switching elements for controlling a direction of the current. Since the switching element operates at a high speed, the switching element generates significant heat, in particular, when the motor is driven at a high load at a high temperature like the summer, a failure occurs in the switching element of the inverter, so the switching element is highly likely to be damaged.

(Prior Art 1) US Patent Registration No. U.S. Pat. No. 7,149,098 (registered on Dec. 12, 2006)

(Prior Art 2) US Patent Unexamined Publication No. US 2002/0196004 (published on Dec. 26, 2002)

DISCLOSURE

Technical Problem

The present disclosure is contrived considering such a situation, and an object of the present disclosure is to provide a device and a method for preventing a damage of a switching element of an inverter.

Another object of the present disclosure is to provide a device and a method for suppressing excessive temperature rise of the switching element constituting the inverter.

Yet another object of the present disclosure is to provide a device and a method for limiting a current output of the inverter.

Meanwhile, the technical objects of an embodiment of the present disclosure are not limited to the aforementioned technical objects, and other technical objects, which are not mentioned above, will be apparently appreciated by a person having ordinary skill in the art to which the embodiment of the present disclosure pertains from the following description.

Technical Solution

In order to implement the object, an inverter control device according to an embodiment of the present disclosure includes: an inverter control unit, which generates, on the basis of a signal detected from the motor or an inverter, a PWM (pulse width modulation) signal for controlling the rotation speed or torque of a motor, in order to supply the PWM signal to the inverter; and a current limitation unit, which applies a detected temperature to an equation based on a first temperature and a second temperature that is higher than the first temperature, so as to calculate a current limitation rate for limiting a current to be supplied to the motor through the inverter, in order to provide the current limitation rate to the inverter control unit, and the inverter control unit changes the PWM signal on the basis of the current limitation rate.

A system according to another embodiment of the present disclosure includes: a motor which rotates, and outputting a predetermined torque or power; an inverter generating a drive signal for driving the motor and providing the drive signal to the motor; and an inverter control device generating, based on a signal detected from the motor or the inverter, a PWM (pulse width modulation) signal, and providing the PWM signal to the inverter, applying a detected temperature to an equation based on a first temperature and a second temperature that is higher than the first temperature, so as to calculate a current limitation rate for limiting a current to be supplied to the motor through the inverter, and changing the PWM signal based on the current limitation rate.

An inverter control method according to yet another embodiment of the present disclosure includes: detecting a temperature of an inverter; applying a detected temperature to an equation based on a first temperature and a second temperature that is higher than the first temperature, so as to calculate a current limitation rate for limiting a current to be supplied to the motor through the inverter; and changing a PWM (pulse width modulation) signal generated to control a speed of the motor based on the current limitation rate.

Advantageous Effects

A current which is a most important factor for determining a temperature is directly controlled to effectively suppress temperature rise of an inverter.

Further, the current is limited at a temperature at an interval between a rated operable temperature and a temperature at which an operation should be stopped according to a predetermined equation to easily apply the inverter control device and method of the present disclosure to multiple applications using the inverter without reliability data and in spite of a change in load or part.

Further, the temperature rise of the inverter is suppressed, so a system can operate at a maximum load.

Effects which can be obtained in the present disclosure are not limited to the aforementioned effects and other unmentioned effects will be clearly understood by those skilled in the art to which the embodiment of the present disclosure pertains from the following description.

DESCRIPTION OF DRAWINGS

FIG. 1 illustrates, as a functional block, an inverter control system according to an embodiment of the present disclosure;

FIG. 2 illustrates, as the functional block, a specific configuration of a control device in FIG. 1;

FIG. 3 illustrates a graph illustrating a primary equation for limiting an output current according to a temperature;

FIG. 4 is a table showing a relationship between the temperature, a current limitation rate, and a power according to the graph of FIG. 3;

FIG. 5 illustrates an operation flowchart for an inverter control method according to an embodiment of the present disclosure;

FIG. 6 illustrates an example in which resonance is generated in a temperature and an output of the inverter when the inverter is controlled by prior art without applying a current limitation method of the inverter according to the present disclosure;

FIG. 7 illustrates an example in which the temperature and the output of the inverter stably convert when limiting the output current by setting a rated load temperature and a trip level temperature to 95 degrees and 100 degrees, and applying the control method according to the present disclosure;

FIG. 8 illustrates an example in which the temperature and the output of the inverter stably convert when limiting the output current by setting a rated load temperature and a trip level temperature to 93 degrees and 95 degrees, and applying the control method according to the present disclosure;

FIG. 9 illustrates a conventional method for limiting an operation frequency of a compressor according to the temperature;

FIG. 10 illustrates an example in which an abnormal situation occurs in the temperature and the power upon driving the inverter when applying the conventional method;

FIG. 11A illustrates an example in which the temperature, an RPM, and an output converge when limiting the output current by applying the control method according to the present disclosure; and FIG. 11B illustrates the temperature, the RPM, the output, and the current of the inverter at an initial time represented by a dotted-line box in FIG. 11A.

BEST MODE

An inverter control device and method described in the present disclosure may be described as follows.

An inverter control device according to an embodiment may include: an inverter control unit, which generates, on the basis of a signal detected from the motor or an inverter, a PWM (pulse width modulation) signal for controlling the rotation speed or torque of a motor, in order to supply the PWM signal to the inverter; and a current limitation unit, which applies a detected temperature to an equation based on a first temperature and a second temperature that is higher than the first temperature, so as to calculate a current limitation rate for limiting a current to be supplied to the motor through the inverter, in order to provide the current limitation rate to the inverter control unit, and the inverter control unit may change the PWM signal on the basis of the current limitation rate.

In an embodiment, the inverter control device may further include a temperature detection unit for detecting a temperature of the inverter.

In an embodiment, the temperature detection unit may detect a temperature of a switching element included in the inverter by using a negative temperature coefficient (NTC) thermistor.

In an embodiment, the current limitation unit may generate the current limitation rate as 1 when the detected temperature is lower than the first temperature, generate the current limitation rate as 0 when the detected temperature is higher than the second temperature, and generate the current limitation rate such that the current limitation rate gradually decreases to be between 0 and 1 as the detected temperature increases when the detected temperature is between the first temperature and the second temperature.

In an embodiment, the current limitation unit may store the first temperature and the second temperature and coefficient data expressing the equation, and calculate the current limitation rate by calculating the detected temperature and the coefficient data.

In an embodiment, the inverter control unit may control a duty of the PWM signal based on the current limitation rate.

In an embodiment, the first temperature may be a rated load temperature for operating a system including the motor with a rated load, and the second temperature may be a trip level temperature for immediately stopping the system.

In an embodiment, the inverter control unit may include a location estimation unit estimating a location and a speed of a rotor of the motor, a speed control unit generating a current command value such that a speed error converges to 0 based on a target speed and the estimated speed, and a current control unit generating a current error based on the current command value and a current value flowing on the motor, and generating the PWM signal for driving the motor based on the current error and the estimated location.

In an embodiment, the current control unit may change the duty of the PWM signal based on the current limitation rate provided by the current limitation unit.

In an embodiment, the current control unit may down-control the duty of the PWM signal when the current limitation rate is between 0 and 1, change the PWM signal to a current signal when the current limitation rate is 0, and not change the PWM signal when the current limitation rate is 1.

A system according to another embodiment may include: a motor which rotates, and outputting a predetermined torque or power; an inverter generating a drive signal for driving the motor and providing the drive signal to the motor; and an inverter control device generating, based on a signal detected from the motor or the inverter, a PWM (pulse width modulation) signal, and providing the PWM signal to the inverter, applying a detected temperature to an equation based on a first temperature and a second temperature that is higher than the first temperature, so as to calculate a current limitation rate for limiting a current to be supplied to the motor through the inverter, and changing the PWM signal based on the current limitation rate.

An inverter control method according to yet another embodiment may include: detecting a temperature of an inverter; applying a detected temperature to an equation based on a first temperature and a second temperature that is higher than the first temperature, so as to calculate a current limitation rate for limiting a current to be supplied to the motor through the inverter; and changing a PWM (pulse width modulation) signal generated to control a speed of the motor based on the current limitation rate.

In an embodiment, in the calculating, the current limitation rate is calculated as 1 when the detected temperature is lower than the first temperature, the current limitation rate may be calculated as 0 when the detected temperature is higher than the second temperature, and the current limitation rate may be calculated such that the current limitation rate gradually decreases to be between 0 and 1 as the detected temperature increases when the detected temperature is between the first temperature and the second temperature.

In an embodiment, in the changing, a duty of the PWM signal may be controlled based on the current limitation rate.

In an embodiment, in the changing, the duty of the PWM signal may be down-controlled when the current limitation rate is between 0 and 1, the PWM signal may be changed to a current signal when the current limitation rate is 0, and the PWM signal may not be changed when the current limitation rate is 1.

[Mode for Disclosure]

Hereinafter, embodiments disclosed in the present disclosure will be described in detail with reference to the accompanying drawings and the same or similar components are denoted by the same reference numerals regardless of a sign of the drawing, and duplicated description thereof will be omitted.

In describing the embodiments disclosed in the present disclosure, it should be understood that, when it is described that a component is "connected to" or "accesses" another component, the component may be directly connected to or access the other component or a third component may be present therebetween.

Further, in describing an embodiment disclosed in the present disclosure, a detailed description of related known technologies will be omitted if it is determined that the detailed description makes the gist of the embodiment of the present disclosure unclear. Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Meanwhile, the term "disclosure" may be replaced with terms such as document, specification, description, etc.

In order to prevent a switching element constituting an inverter from being damaged according to temperature rise when a motor is driven in a high load state or a high temperature environment, a method is used in related art, which measures a temperature of the inverter by measuring a negative temperature coefficient (NTC) voltage by mounting a thermistor on an element generating a lot of heat, e.g., the switching element of the inverter, sets a predetermined number boundary temperature in a temperature (hereinafter, referred to as a trip level temperature) to stop motor driving and a temperature interval lower than the trip level temperature, and decelerates the motor or stops the driving of the motor according to a predetermined condition at each boundary temperature (or reference temperature) based on the predicted temperature.

In order to guarantee a stable operation of the system, a first temperature (or rated load temperature) at which the system should operate at a rated load (or full load), a second temperature (or trip level temperature) at which the system should be immediately stopped, and a third temperature (or operable temperature) which may allow the system to operate should be considered.

That is, the conventional method adopts a method in which a system developer arbitrarily sets one or more boundary temperature (or reference temperatures) at a third temperature interval between the first temperature and the second temperature, and controls a rotational speed of the motor by comparing an actual temperature and the boundary temperature.

Further, in the convention method, the trip level temperature and the plurality of boundary temperatures should be set by considering operation temperature environments in multiple applications and a load situation in the application to which the motor and the inverter are applied, and the setting varies for each application, and whenever a load or a part of the application is changed, the trip level temperature and the boundary temperature should be set again based on test data, and multiple environment tests regarding whether a control result according to the setting or a change of the setting satisfies a requirement should be conducted, and it takes a lot of time in confirming such a test.

Further, in the conventional method, when the trip level temperature or the boundary temperature is wrongly set, a power swing phenomenon is prevent in which an input power or a driving current input into the motor is see-saw in a specific situation, and there are many cases in which when temperature rise is steep, motor driving is suddenly stopped by exceeding the trip level temperature in spite of the control of the temperature.

An inventor according an embodiment of the present disclosure proposes a method for proportionally limiting a current which may flow to a system by detecting a temperature of a part, and applying the detected temperature to a current equation based on a first temperature (or rated load temperature) and a second temperature (or trip level temperature) by considering that a temperature of a part (a part primarily included in the inverter) constituting the system is gradually saturated (that a slope of a temperature change gradually decreases), that electrical heat of the inverter is determined by a current I and a resistance R (I^2R), and a controllable factor is the current, that since the system should stop to operate at a limited temperature (or trip level temperature) of the part, the current should not be made to flow, and that when no current flow on the part, heat is not generated, in a state in which the first temperature (or rated load temperature) and the second temperature (or trip level temperature) for a system to be controlled.

FIG. 1 illustrates, as a functional block, an inverter control system according to an embodiment of the present disclosure.

As illustrated in FIG. 1, the inverter control system according to an embodiment may be configured to include a control device 10, an inverter 20, and a motor 30.

The motor 30 may be a motor for driving a compressor of an air conditioning system, and in particular, may be a brushless motor without a brush in order to maintain a long mechanical life-span, that is, a brushless DC (BLDC) motor 10 that rotates a rotor by receiving a power from the inverter 20 through a switching function without using the brush and a commutator to provide a rotational force.

Here, in the BLDC motor as a structure without an insulator conductor such as a carbon brush for transferring the power, a magnet is mounted on the rotor of the motor, and coil generating an inductance component are wound on a stator in 3 phases, and 3-phase power for rotating the rotor is supplied to the coils.

The inverter 20 generates AC power to drive the motor 30. The inverter 20 may include a plurality of switching elements such as Metal Oxide Silicon Field Effect Transistor (MOSFET) for generating a 3-phase AC power.

The inverter 20 may generate a 3-phase AC current which is a drive signal based on a pulse width modulation (PWM) signal supplied by the control device 10, and supply the generated 3-phase AC current to the motor 30.

The control device 10 may generate a PWM signal for controlling a speed, a power, and a torque of the motor 10 based on the signal detected by the motor 30, and supply the generated PWM signal to the inverter 20. Further, the control device 10 measures a temperature of at least one component constituting a motor control system, and applies the measured temperature to an equation determined by a rated load temperature and a trip level temperature to limit a current magnetize of the drive signal output by the inverter 20.

FIG. 2 illustrates, as the functional block, a specific configuration of the control device 10 in FIG. 1.

As illustrated in FIG. 2, the control device 10 may be configured to include an inverter control unit 110, a temperature detection unit 120, and a current limitation unit 130.

First, an operation of the inverter control unit 110 will be described in brief.

The inverter control unit 110 may generate a PWM signal for controlling a speed, a power, and a torque of the motor 30 based on the signal detected by the motor 30 or the inverter 20, and supply the generated PWM signal to the inverter 20.

The inverter control unit 110 may include a torque control unit, a speed control unit, a current control unit, etc. When the motor 30 does not include a location detection element detecting a location of the rotor, e.g., a hall element or an encoder, the inverter control unit 110 may further include a location estimator for estimating the location or a rotational angular speed of the rotor.

The torque control unit may estimate the torque based on location information or a rotational angular speed of the rotor of the motor 30 output by the detection element or output by the location estimator, acquire a torque error by comparing the estimated torque with a target torque (or a torque instruction value), and generate a target angular speed based on the torque error and output the generated target angular speed to the speed control unit.

The speed control unit may output a control signal for controlling an angular speed of the motor 30 based on the target angular speed output by the torque control unit. That is, the speed control unit may compute an angular speed error based on the target angular speed, and an estimated angular speed output by the location estimation unit, and generate a current instruction value that causes the angular speed error to converge to 0 by applying a proportional integrator to the angular speed error, and the current instruction value may be output for each of a d-axis (magnetic flux axis) component and a q-axis (torque axis) component.

The current control unit may receive the current command values of the d-axis and q-axis components from the speed control unit, and generate current errors of the d-axis and q-axis components by using the current values of the d-axis and q-axis components flowing in the motor 30, which are generated internally, and generate a PWM signal for driving the rotor of the motor 30, and output the generated PWM signal to the inverter 20 based on the current errors of the d-axis and q-axis components and the estimated location of the rotor output by the location estimation unit.

The inverter 20 may generate a 3-phase AC current based on the PWM signal output by the current control unit of the inverter control unit 110 and supply the generated 3-phase AC current to the motor 30.

When a target torque is presented by a host, the inverter control unit 110 may include the torque control unit as described above. However, when the target angular speed is presented from the host, the inverter control unit 110 does not include the torque control unit or bypasses the torque control unit, and the speed control unit may generate a current command value based on a difference between the target angular speed and the estimated angular speed.

Meanwhile, the temperature detection unit 120 included in the control device 10 may detect a temperature of the switching element or inverter power module (IPM) constituting the inverter 20 and output the detected temperature as a digital value. The temperature detection unit 120 may measure the temperature of the switching element by using a negative temperature coefficient (NTC) thermistor. In FIG. 2, the temperature detection unit 120 is illustrated as being included in the control device 10, but the temperature detection unit 120 may also be configured to be included in the inverter 20.

The current limitation unit 130 may limit the current output by the inverter 20 based on the temperature detected by the temperature detection unit 120.

FIG. 3 illustrates a graph illustrating a primary equation for limiting an output current according to a temperature, and an operation of the current limitation unit 130 is described in detail with reference to FIG. 3.

First, a rated load temperature T1 at which the system should be operated at a rated load and a trip level temperature T2 at which the system should be stopped immediately may be set, and T1 and T2 may be set considering an operating environment or load of the system.

When a temperature of a part included in the inverter 20 detected by the temperature detection unit 120 is lower than the rated load temperature T1, the current control unit included in the inverter control unit 110 may generate the PWM signal based on the current error and the estimated location of the rotor, and output the generated PWM signal to the inverter 20 without any restriction on the PWM signal.

The current control unit should not output the PWM signal to the inverter 20 when the temperature detected by the temperature detection unit 120 is equal to or higher than the trip level temperature T2.

On the other hand, when the temperature detected by the temperature detection unit 120 is between the rated load temperature T1 and the trip level temperature T2, the current limitation unit 130 may set a current limitation rate corresponding to the detected temperature according to an equation based on the rated load temperature T1 and the trip level temperature T2, and provide the set current limitation rate to the current control unit of the inverter control unit 110.

The current control unit may generate a PWM signal which causes a desired torque or a desired angular speed to be achieved based on the current error and the estimated location of the rotor, and output a duty of the generated PWM signal based on the current limitation rate provided by the current limitation unit 130, and output the duty to the inverter 20.

As illustrate in FIG. 3, the current limitation unit 310 allows the current control unit to need not to control the duty of the PWM signal by setting the current limitation rate to 100% of a rated current at the rated load temperature T1 when the detected temperature is equal to or lower than the rated load temperature T1.

Further, when the detected temperature is equal to or higher than the rated load temperature T1, the current limitation unit 130 gradually reduces the current limitation rate until the detected temperature reaches the trip level temperature T2 to set the current limitation rate to 0% when the detected temperature reaches the trip level temperature T2.

FIG. 3 illustrates an example of changing the current limitation rate to a straight from or a linear equation form in which the detected temperature changes with a constant slope as the temperature increases between the rated load temperature T1 and the trip level temperature T2, but the embodiment of the present disclosure is not limited thereto, and the current limitation rate may also be determined in the form of a higher-order equation of a quadratic equation or higher in which a change slope of the current limitation rate changes according to a change in temperature.

The linear equation of FIG. 3 may be expressed as [current limitation rate=(T−T2)/(T1−T2)] when the detected temperature is T.

In order to further increase the stability of a system operation by reducing the change (or slope) in the current limitation rate near the rated load temperature T1 and increasing the change (slope) in the current limitation rate near the trip level temperature T2, for example, the current limitation rate may also be expressed as a quadratic equation such as [current limitation rate=−((T−T1)/(T2−T1))^2+1].

Alternatively, any equation is also possible in which the current limitation rate is 1 at the rated load temperature T1 and 0 at the trip level temperature T2, and the current limitation rate gradually decreases during the temperature increase between the rated load temperature T1 and the trip level temperature T2.

The current limitation unit 130 may store information related to the equation, calculate the current limitation rate by applying the detected temperature to the stored equation, and transfer the calculated current limitation rate to the current control unit of the inverter control unit 110.

FIG. 4 is a table showing a relationship between the temperature, a current limitation rate, and a power according to the graph of FIG. 3, and as data for values for a plurality of temperatures according to a linear equation in which the rated load temperature T1 is set to 80 degrees and the trip level temperature T2 is set to 95 degrees, an expected output is 330 W at the rated load temperature T1.

The measured temperature measured by the temperature detection unit 120 is converted to a digital value and input, and when a digital value of 80 degrees, which is the rated load temperature T1, is 1672, and a digital value of 95 degrees, which is the trip level temperature T2, is 1976, the linear equation of the current limitation rate may be determined as −0.00333× T+6.586

The current limitation unit 130 may stores a coefficient of the equation expressing the current limitation rate, apply the measured temperature input from the temperature detection unit 120 to the equation (by calculating the coefficient), and calculate the current limitation rate and transfer the calculated current limitation rate to the current control unit.

The output value of the system (or motor) may also be calculated in proportion to the current limitation rate, and may be acquired by multiplying the linear equation expressing the current limitation rate by an expected power at the rated load temperature T1.

FIG. 5 illustrates an operation flowchart for an inverter control method according to an embodiment of the present disclosure.

The current limitation unit 130 stores data (rated load temperature T1, trip level temperature T2, and equation coefficient) related to the equation expressing the current limitation rate, which is determined by the rated load temperature T1 and the trip level temperature T2 set appropriately set to the system.

The current control unit of the inverter control unit 110 may control the duty of the PWM signal to be output to the inverter according to the current limitation rate calculated and output by the current limitation unit 130.

First, the temperature detection unit 120 measurers the temperature of the switching element or the inverter power module IPM included in the inverter 20, and converts the measured temperature into a digital value T and outputs the digital value T to the current limitation unit 130.

The current limitation unit 130 compares the digital value T of the measured temperature with the rated load temperature T1 (S420), and when the digital value T of the measured temperature is lower than the rated load temperature T1 (Yes in S420), the current limit rate is calculated as 1 and transferred to the current control unit of the inverter control unit 110, and the current control unit generates a PWM signal corresponding to a target angular speed of the rotor (or target motor torque or power), and since the current limitation rate is 1, the PWM signal not changed, but supplied to the inverter 20 as it is, and thus a current corresponding to a target speed may be supplied to the motor 30 (S430).

When the digital value T of the measured temperature is higher than the rated load temperature T1 (No in S420), the current limitation unit 130 compares the digital value T of the measured temperature with the trip level temperature T2 again (S440), and when the temperature T is lower than the trip level temperature T2 (Yes in S440), the current limitation rate is calculated by applying the temperature T to the equation and transferred to the current control unit of the inverter control unit 110 (in this case, the current limitation rate is calculated as a value between 0 and 1), and the current control unit may generate the PWM signal corresponding to the target speed (or target torque or power), and may down-control the duty of the PWM signal according to the transferred current rate, and supply the duty to the inverter (S450).

The inverter 20 drives the motor 30 by generating a drive signal according to the PWM signal with the down-controlled, so a smaller amount of current than a current required for driving at the target speed (or target torque or target power) is supplied the motor 30, which may be driven at a lower speed (torque or power) lower than the target speed.

On the other hand, when the temperature T is higher than the trip level temperature T2 (No in S440), the current limitation unit 130 determines that the temperature of the switching element included in the inverter 20 is too high, and calculates the current limitation rate as 0 and transfers the current limitation rate of 0 to the current control unit of the inverter control unit 110, and the current control unit generates the PWM signal corresponding to the target speed (or target torque or target power), but since the current limitation rate is 0, supplies a DC signal to the inverter the duty of the PWM signal is set to 0 by changing the duty of the PWM signal to 0 (changing the duty to a direct current signal), accordingly, the inverter 20 does not supply current to the motor 30 (S460).

That is, when the temperature detected by the temperature detection unit 120 is between the rated load temperature T1 and the trip level temperature T2, the current limitation unit

130 sets the current limitation rate according to a predetermined equation based on the rated load temperature T1 and the trip level temperature T2, and enters a limitation mode of limiting the current supplied to the motor 30, and as a result, the temperature of the inverter 20 may converge to saturate at any temperature between the rated load temperature T1 and the trip level temperature T2.

As such, the embodiment of the present disclosure directly controls the current, which is the most important factor in determining the temperature of the system (mainly the inverter 20), thereby certainly preventing a state in which the temperature of the system cannot be controlled, which occurs and becomes a problem in the conventional method.

FIG. 6 illustrates an example in which resonance is generated in a temperature and an output of the inverter when the inverter is controlled by prior art without applying a current limitation method of the inverter according to the present disclosure, FIG. 7 illustrates an example in which the temperature and the output of the inverter stably convert when limiting the output current by setting a rated load temperature and a trip level temperature to 95 degrees and 100 degrees, and applying the control method according to the present disclosure, and FIG. 8 illustrates an example in which the temperature and the output of the inverter stably convert when limiting the output current by setting a rated load temperature and a trip level temperature to 93 degrees and 95 degrees, and applying the control method according to the present disclosure.

FIG. 6 illustrates an example of a case where the target power of the air conditioning system is set to 330 W and the inverter is controlled according to the conventional method, and when the inverter starts to operate, the temperature gradually increases around 70 degrees while the power quickly approaches 330 W, and after some time has passed and the temperature exceeds 95 degrees and reaches about 96 to 97 degrees, a sudden swing phenomenon in which the output and temperature fluctuate may be seen.

On the other hand, FIG. 7 illustrates a result of applying a method of limiting the current by setting the rated load temperature T1 and the trip level temperature T2 to 95 degrees and 100 degrees, respectively, according to an embodiment of the present disclosure, and as the temperature exceeds 95 degrees, a current limitation mode is applied (a current limitation flag is set), and the current applied to the motor is limited, and as a result, the temperature does not increase over time and converges to around 95 degrees, but it can be seen that the output or input power of the motor converges to 293 W, which is lower than the target power of 330 W according to the limitation of the applied current.

Further, FIG. 8 illustrates a result of applying a method of limiting the current by setting the rated load temperature T1 and the trip level temperature T2 to 93 degrees and 95 degrees, respectively, according to an embodiment of the present disclosure, and as the temperature exceeds 93 degrees, a current limitation mode is applied (a current limitation flag is set), and the current applied to the motor is limited, and as a result, the temperature does not increase over time and converges to around 93 degrees, but it can be seen that the output or input power of the motor converges to 270 W, which is lower than the target power of 330 W according to the limitation of the applied current.

For reference, the time on a horizontal axis of FIG. 6 is different from the time on the horizontal axis of FIGS. 7 and 8, and in FIG. 6, which corresponds to the result according to the conventional method, the power swing phenomenon occurred even before a long time had elapsed, while in the implementation of this specification In FIGS. 7 and 8, which in FIGS. 7 and 8 corresponding to the result according to the embodiment of the present disclosure, a stable temperature and a power that converges to a constant value may be seen even after a much longer time has elapsed in FIGS. 7 and 8 than in FIG. 6.

FIG. 9 illustrates a conventional method for limiting an operation frequency of a compressor according to the temperature, and FIG. 10 illustrates an example in which an abnormal situation occurs in the temperature and the power upon driving the inverter when applying the conventional method.

As illustrated in FIG. 9, the conventional method of controlling the inverter considering the temperature also performs a control operation of setting the trip level temperature and divides the temperature below the trip level temperature into predetermined sections (or zones) based on a predetermined boundary temperature, and increasing or decreasing an operation frequency in each zone.

In the conventional method of FIG. 9, the temperature is divided into six zones according to the temperature with the trip level temperature as the highest boundary temperature, and no control is performed to limit the operation frequency in Zone #0, which is the normal zone, the operation frequency is gradually increased (for example, when the temperature is maintained for 1 minute (60 seconds), the frequency is increased by a predetermined RPM (S1)) to prevent rapid ascent of the frequency in Zone #1, which is a rising buffer zone as a higher temperature zone than Zone #0, and a current status is maintained in Zone #2, which is a safety zone.

Further, in the conventional method of FIG. 9, an operation of lowering the operation frequency to prevent the temperature rise in a higher temperature zone than Zone #2 which is the safety zone, when the temperature of the corresponding zone is maintained for 1 minute (60 seconds), the frequency is lowered by the predetermined RPM (S1) in order to lower the temperature in Zone #3, when the temperature of the corresponding zone is maintained for 30 seconds, the frequency is hurriedly lowered by the predetermined RPM (S1) in order to lower the temperature in Zone #4, and the drive signal is immediately stopped in Zone #5 in which the temperature exceeds the trip level temperature (represented by T4 in FIG. 9).

As illustrated in FIG. 9, the conventional method controls the inverter by dividing the temperature into several zones according to the operating characteristics or installation environment of the air conditioning system, and an operation of setting a threshold temperature for dividing the temperature into the several zones, or controlling the frequency in the corresponding zone may be different for each system.

In addition, even if the conventional method of FIG. 9 is applied, it is difficult to avoid abnormal situations in temperature and power as illustrated in FIG. 10.

In FIG. 10, as the temperature changes, the control of the operation frequency (or RPM) is performed and the RPM and power fluctuate, and at any time (150 in FIG. 10) when a predetermined time elapsed after the temperature limitation logic in FIG. 9 falls below 80 degrees (T2 in FIG. 9), and the limitation mode is released, a swing phenomenon in which the RPM suddenly increases and then decreases repeatedly occurs, so a trip phenomenon occurs in which the temperature rises, and the temperature exceeds the trip level temperature (T4 in FIG. 9), which supplies no current to the motor.

FIG. 11*a* illustrates an example in which the temperature, an RPM, and an output converge when limiting the output current by applying the control method according to the present disclosure, and FIG. 11*b* illustrates the temperature, the RPM, the output, and the current of the inverter at an initial time represented by a dotted-line box.

FIGS. 11*a* and 11*b* illustrate a result of applying a method of limiting current by setting the rated load temperature T1 and the trip level temperature T2 to 80 degrees and 95 degrees, respectively, and as illustrated in FIG. 11*a*, it can be seen that even though a long time (5400, approximately 1 hour and 30 minutes) elapsed, a power swing does not occur, the temperature converges to about 86 to 87 degrees, the RPM, power, and current values also saturate or converge to constant values.

In addition, as illustrated in FIG. 11*b*, which enlarges the initial operation time near the dotted box in FIG. 11*a*, the RPM, power, and temperature increase as current is applied to converge to the RPM instruction (target RPM) at the beginning of the system operation, and then when the temperature exceeds 80 degrees which is the rated load temperature T1, the current supplied to the motor is limited, and the RPM and the power decrease to lower values than values before limitation, and maintain constant values, and the temperature which continuously increases according to the operation of the inverter does not increase any longer and converges to a constant temperature (about 96 to 87 degrees) after a predetermined time elapsed at the time when the RPM and the power are lowered.

As such, it can be seen that the stability of system control is secured by minimizing the section in which the current or temperature suddenly changes due to control.

The present disclosure is not limited to the embodiments described herein, and it would be apparent to those skilled in the art that various changes and modifications might be made without departing from the spirit and the scope of the present disclosure. Therefore, it will be determined that the changed examples or modified examples are included in the appended claims of the present disclosure.

The invention claimed is:

1. An inverter control device comprising:

an inverter control unit, which generates, on the basis of a signal detected from a motor or an inverter, a PWM (pulse width modulation) signal for controlling the rotation speed or torque of the motor, in order to supply the PWM signal to the inverter;

a current limitation unit, which applies a detected temperature to an equation based on a first temperature and a second temperature that is higher than the first temperature, so as to calculate a current limitation rate for limiting a current to be supplied to the motor through the inverter, in order to provide the current limitation rate to the inverter control unit; and a temperature detection unit for detecting a temperature of the inverter, wherein the inverter control unit can change the PWM signal on the basis of the current limitation rate, and wherein the current limitation unit generates the current limitation rate as 1 when the detected temperature is lower than the first temperature, generates the current limitation rate as 0 when the detected temperature is higher than the second temperature, and generates the current limitation rate such that the current limitation rate gradually decreases to be between 0 and 1 as the detected temperature increases when the detected temperature is between the first temperature and the second temperature.

2. The inverter control device of claim 1, wherein the temperature detection unit detects a temperature of a switching element included in the inverter by using a negative temperature coefficient (NTC) thermistor.

3. The inverter control device of claim 1, wherein the current limitation unit stores the first temperature and the second temperature and coefficient data expressing the equation, and calculates the current limitation rate by calculating the detected temperature and the coefficient data.

4. The inverter control device of claim 1, wherein the inverter control unit controls a duty of the PWM signal based on the current limitation rate.

5. The inverter control device of claim 1, wherein the first temperature is a rated load temperature for operating a system including the motor with a rated load, and the second temperature is a trip level temperature for immediately stopping the system.

6. The inverter control device of claim 1, wherein the inverter control unit includes:

a location estimation unit estimating a location and a speed of a rotor of the motor, a speed control unit generating a current command value such that a speed error converges to 0 based on a target speed and the estimated speed; and a current control unit generating a current error based on the current command value and a current value flowing on the motor, and generating the PWM signal for driving the motor based on the current error and the estimated location.

7. The inverter control device of claim 6, wherein the current control unit changes a duty of the PWM signal based on the current limitation rate provided by the current limitation unit.

8. The inverter control device of claim 7, wherein the current control unit down-controls the duty of the PWM signal when the current limitation rate is between 0 and 1, changes the PWM signal to a current signal when the current limitation rate is 0, and does not change the PWM signal when the current limitation rate is 1.

9. A system comprising:

a motor which rotates, and outputting a predetermined torque or power;

an inverter generating a drive signal for driving the motor and providing the drive signal to the motor; and an inverter control device generating, based on a signal detected from the motor or the inverter, a PWM (pulse width modulation) signal, and providing the PWM signal to the inverter, applying a detected temperature to an equation based on a first temperature and a second temperature that is higher than the first temperature, so as to calculate a current limitation rate for limiting a current to be supplied to the motor through the inverter, and changing the PWM signal based on the current limitation rate, wherein the inverter control device generates the current limitation rate as 1 when the detected temperature is lower than the first temperature, generates the current limitation rate as 0 when the detected temperature is higher than the second temperature, and generates the current limitation rate such that the current limitation rate gradually decreases to be between 0 and 1 as the detected temperature increases when the detected temperature is between the first temperature and the second temperature.

10. The system of claim 9, wherein the inverter control device stores the first temperature and the second temperature and coefficient data expressing the equation, and calculates the current limitation rate by calculating the detected temperature and the coefficient data.

11. The system of claim 9, wherein the inverter control device controls a duty of the PWM signal based on the current limitation rate.

12. The system of claim 9, wherein the first temperature is a rated load temperature for operating a system including the motor with a rated load, and the second temperature is a trip level temperature for immediately stopping the system.

13. An inverter control method comprising:

detecting a temperature of an inverter;

applying a detected temperature of the inverter to an equation based on a first temperature and a second temperature that is higher than the first temperature, so as to calculate a current limitation rate for limiting a current to be supplied to the motor through the inverter; and changing a PWM (pulse width modulation) signal generated to control a speed of the motor based on the current limitation rates, wherein in the calculating, the current limitation rate is calculated as 1 when the detected temperature is lower than the first temperature, the current limitation rate is calculated as 0 when the detected temperature is higher than the second temperature, and the current limitation rate is calculated such that the current limitation rate gradually decreases to be between 0 and 1 as the detected temperature increases when the detected temperature is between the first temperature and the second temperature.

14. The inverter control method of claim 13, wherein in the changing, a duty of the PWM signal is controlled based on the current limitation rate.

15. The inverter control method of claim 14, wherein in the changing, the duty of the PWM signal is down-controlled when the current limitation rate is between 0 and 1, the PWM signal is changed to a current signal when the current limitation rate is 0, and the PWM signal is not changed when the current limitation rate is 1.

* * * * *